United States Patent [19]

Ting

[11] 4,244,329

[45] Jan. 13, 1981

[54] CLEAN SPARK IGNITION INTERNAL COMBUSTION ENGINE

[76] Inventor: Hui-Tzeng Ting, Apt. 2M 245 E. 149th St., New York, N.Y. 10451

[21] Appl. No.: 867,480

[22] Filed: Jan. 6, 1978

Related U.S. Application Data

[63] Continuation-in-part of Ser. No. 667,409, Mar. 16, 1976, Pat. No. 4,036,187, Ser. No. 376,304, Jul. 6, 1973, abandoned, Ser. No. 772,811, Feb. 28, 1977, abandoned, and Ser. No. 808,636, Jun. 21, 1977, abandoned.

[51] Int. Cl.² .................... F02B 19/10; F02B 19/16
[52] U.S. Cl. ........................... 123/261; 123/286
[58] Field of Search ......... 123/191 S, 191 SP, 32 ST, 123/32 SP, 75 B, 32 E

[56] References Cited

U.S. PATENT DOCUMENTS

| | | | |
|---|---|---|---|
| 1,537,748 | 5/1925 | Cole | 123/32 ST |
| 1,623,384 | 4/1927 | Burtnett | 123/32 SP |
| 1,722,145 | 7/1929 | Hermann | 123/32 SP |
| 2,076,030 | 4/1937 | Kahllenberger | 123/32 E |
| 2,888,912 | 6/1959 | Brueder | 123/32 ST |
| 2,986,129 | 5/1961 | Henry | 123/32 ST |
| 3,076,901 | 3/1963 | Hallberg | 123/32 SP |
| 3,948,227 | 4/1976 | Guenther | 123/32 SP |
| 3,983,858 | 10/1976 | Sevald | 123/32 ST |
| 4,052,973 | 10/1977 | Clauser | 123/32 ST |

Primary Examiner—Ronald B. Cox
Attorney, Agent, or Firm—Stuart S. Bowie

[57] ABSTRACT

A two or four-stroke spark ignition engine has one or more fuel injectors located at or near BDC and/or in the inlet manifold, and an auxiliary chamber or recess in or adjacent to its cylinderhead to trap a lean mixture for causing more complete combustion of a rich mixture in the main chamber after the rich mixture is ignited.

39 Claims, 31 Drawing Figures

Fig. IIB

Fig. IIA

CLEAN SPARK IGNITION INTERNAL COMBUSTION ENGINE

This application is a continuation-in-part of my former applications, Ser. No. 667,409 filed Mar. 16, 1976, now U.S. Pat. No. 4,036,187 Ser. No. 376,304 filed July 6, 1973 (now abandoned) and Ser. No. 772,811 filed Feb. 28, 1977 (now abandoned) and Ser. No. 808,636 filed June 31, 1977, now abandoned (currently pending).

BACKGROUND OF THE DISCLOSURE

The present invention relates to apparatus and method for producing low emission of hydrocarbon, carbon monoxide and nitrous oxide in spark ignition gasoline engines, particularly for use in automotive vehicles and trucks.

The present invention discloses method and apparatus for achieving such low emission through the development of what is commonly termed a stratified charge, i.e., wherein the gasoline and air are introduced into the combustion area in a stratified form whereby a fuel-rich portion is essentially segregated from a second portion which is essentially air, and such stratification is preserved until ignition. Using the method and apparatus as disclosed herein, it is possible to achieve combustion using air-fuel ratios in excess of 24:1 which, in turn, produces exceedingly low emissions of the type mentioned. The method and apparatus, therefore, enable a manufacturer to produce gasoline powered engines which meet the low emission criteria established by the U.S. Federal Government and other governments for the purpose of reducing air pollution.

Stratified charge engines are not, per se, new. Perhaps the best known and certainly the most successful such engine on the U.S. Market today is that manufactured by the Honda Company and installed in its model CVCC 4-stroke spark ignition engine, which is believed to be substantially according to Honda U.S. Pat. No. 3,890,942.

The Honda engine employs two inlet valves to admit lean and rich air-fuel mixtures from two separate carborators to the cylinder. The cylinder head of the Honda engine has a recess to accomodate the inlet valve for the rich mixture, and is so shaped as to keep the rich mixture from being completely mixed with the lean mixture outside the recess and in the cylinder. Thus, two separate pockets of lean and rich mixtures are formed at the end of the compression stroke when the rich mixture inside the recess is ignited by a spark plug. When the rich mixture is being burned during the expansion stroke, the lean mixture outside the recess will also be burned when the flame front reaches it. The entry of lean mixture into combustion after the ignition of rich mixture by the spark plug promotes complete combustion and reduces air pollution.

The novelty of the Honda engine apparently is the combination of the following features:
1. One additional inlet valve,
2. One additional carborator, and
3. One separate recess in the cylinder head to keep the lean mixture from being completely mixed with the rich mixture before ignition takes place.

The disadvantages of the Honda engine as compared with conventional 4-stroke spark ignition engines include the following:

1. It is more expensive because of the additional inlet valve and its related mechanism.
2. It is more expensive because of the additional carborator.
3. As compared with the simple hemispherical cylinder head of a conventional engine, the recess cylinder head of the Honda engine has larger surface area to lose heat and thus reduce efficiency. Also the length of the flame path from the spark plug to the remotest point of the cylinder head is longer, and thus the tendency of detonation is larger with the Honda engine.

Other inventors have attempted to produce low emission engines, but all such developments have certain substantial practical difficulties.

For example, Hallberg U.S. Pat. No. 3,079,901 granted Mar. 5, 1963 discloses a piston having an irregularly shaped top which form pockets when the piston is at top dead center. A fuel injector is provided at the top of the cylinder to inject fuel downward into one of the pockets. The difficulty with the Hallberg device, however, is that stratification of the air and fuel cannot really be achieved to a significant degree. This is because the fuel eminating from the fuel injector follows a cone-shaped path which sweeps through the cylinder in an axial direction and the fuel is carried away in the radial direction because turbulence due to the intake stroke is strong in the radial direction and weak in the axial direction. This means that stratification is very poor. Moreover, the Hallberg device could not operate at the high engine speeds necessary for modern use because the fuel would not be adequately positioned in the pocket intended by the Hallberg device at high speeds.

Moreover, in Hallberg, the irregularly shaped piston top will produce a hotter piston temperature and therefore a lower compression ratio. This, in turn, will require a higher octane fuel. As will be seen, the present invention utilizes in its preferred from a piston having an essentially flat top which in turn means that the piston will be cooler in operation and, therefore, the compression ratio can be higher and lower octane fuel can be used.

Finally, in Hallberg, the fuel injector is located directly in the combustion chamber which becomes hot during operation and is under high pressure during the beginning of the expansion stroke. This requires a very expensive type of fuel injector. On the other hand, as will be seen, the present invention utilizes one or more fuel injectors which operate in cool locations under relatively low pressure even during expansion stroke and therefore much less expensive injectors can be used.

Other prior art attempts to produce a successful stratified charge engine have been unsuccessful for a variety of reasons. For example, they do not satisfy the following necessary requirements:
1. The engine must have reasonably high speed.
2. The speed of gas or air flow must be well below the speed of sound so as to avoid choke due to shock wave.
3. A gasoline injector cannot have high injecting pressure because of the low viscosity of gasoline, and thus the penetration of gasoline droplets into the engine cylinder is limited. Also, the droplets will spread like a cone instead of being coherent to one another. Furthermore, the injector must not be overheated such that the gasoline causes vapor lock.

4. There has to be effective segregation between the rich and the lean parts of the air-fuel mixture at the instant of ignition.

5. The manufacturing and operating cost must be reasonable.

The present invention, however, has been proven successful in actual operation. That is, an engine of 1500 cubic centimeter piston displacement constructed according to the present invention has operated at a speed of 3000 revolutions per minute with air-fuel ratios in excess of 24:1 producing extremely low emissions of hydrocarbons (less than 200 ppm), carbon dioxide (less than 8.6%), carbon monoxide (less than 0.01%), and proportionate traces of nitrous oxide. Since the air-fuel ratio required to meet the ultimate requirements for such gases by the U.S. Environmental Protection Agency requires an engine which can operate at approximately 15:1 air-fuel ratio of higher, the present invention is capable of operating well within the ultimate requirements imposed by such agency.

In general, it has been discovered by the present inventor that very high air-fuel ratios can be achieved by constructing an engine having a main combustion chamber and an auxiliary combustion chamber connected by a constricted throat. The main combustion chamber is the area above the piston top and bounded in part by the constricted throat. The auxiliary combustion chamber is fixed (i.e. is not part of the piston) to the engine frame.

In the present invention, gasoline maybe injected through a fuel injector from a port in the cylinder wall at or near bottom dead center (B.D.C.), and the port itself may be at or near B.D.C. or may be somewhat higher up the cylinder wall. The gasoline thus injected forms a layer of rich fuel in the main combustion chamber directly above the piston. Air is introduced in such a way as to be positioned in the auxiliary combustion chamber and a spark plug is positioned so as to ignite the rich fuel pocket in the main combustion chamber.

The fuel may be injected either at or near bottom dead center or through the intake valve as, for example, by means of injection into the intake manifold. In the latter case, a charge of fuel is injected before air is introduced into the manifold so that the charge of fuel forms a rich fuel parcel behind the stem of the intake valve and the air forms a rich air parcel behind the rich fuel parcel, thus forming a stratified configuration. This stratification is maintained when the intake valve is opened because the diffusion of turbulence in a unidirectional flow of fluid is strong in the direction perpendicular to the flow and weak in the direction of the flow. Thus, as the fuel and air parcels enter the cylinder as the piston descends during the intake stroke, the stratification is preserved in the axial direction although the parcels tend to diffuse in a horizontal direction to some degree. Similarly, when the piston rises on the compression stroke, stratification is preserved in the axial direction.

It is possible, in the present invention, to use one or more fuel injectors located in the cylinder wall and one or more fuel injectors located behind the intake valve.

The main combustion chamber, as noted, communicates with an auxiliary combustion chamber through a constricted throat. Thus, when the stratified air and fuel parcels are pushed upward in the cylinder as the piston rises and the air rich portion passes through the constricted throat into the auxiliary chamber, while the rich parcel of fuel is concentrated in the main combustion chamber and around the electrodes of the spark plug or spark plugs, thus providing a rich mixture for ignition. The foregoing and other advantages of the present invention will become apparent from the following description and from the drawings.

DESCRIPTION OF THE DISCLOSURE

Figure 1:
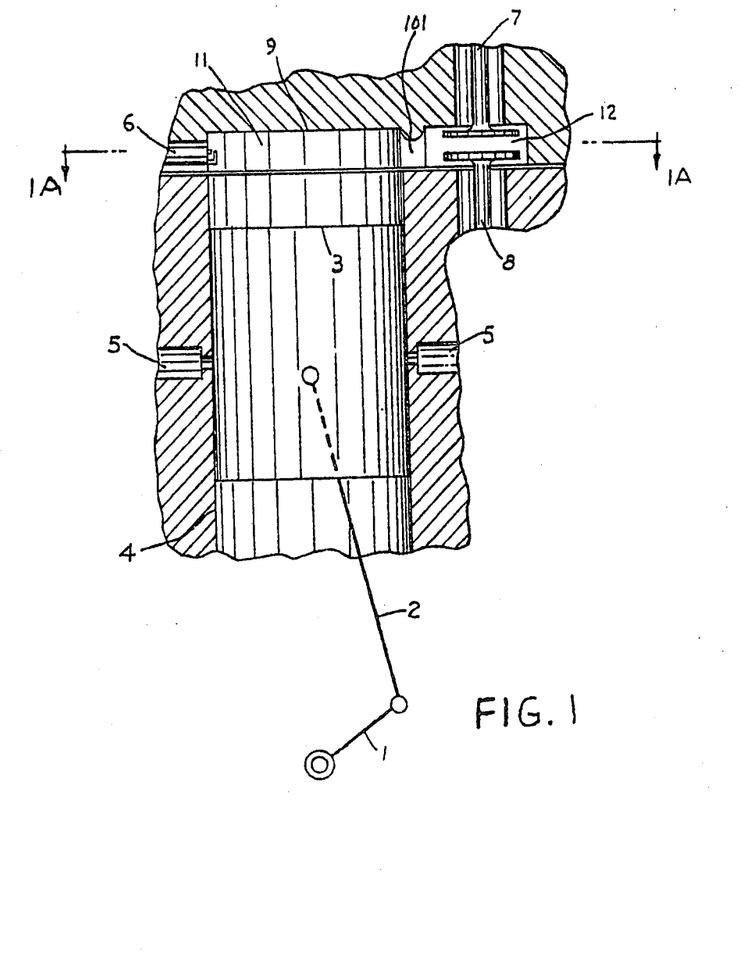
FIG. 1 is an elevation partly in section of the cylinder and other related components of an engine according to the present invention.
Figure 2:
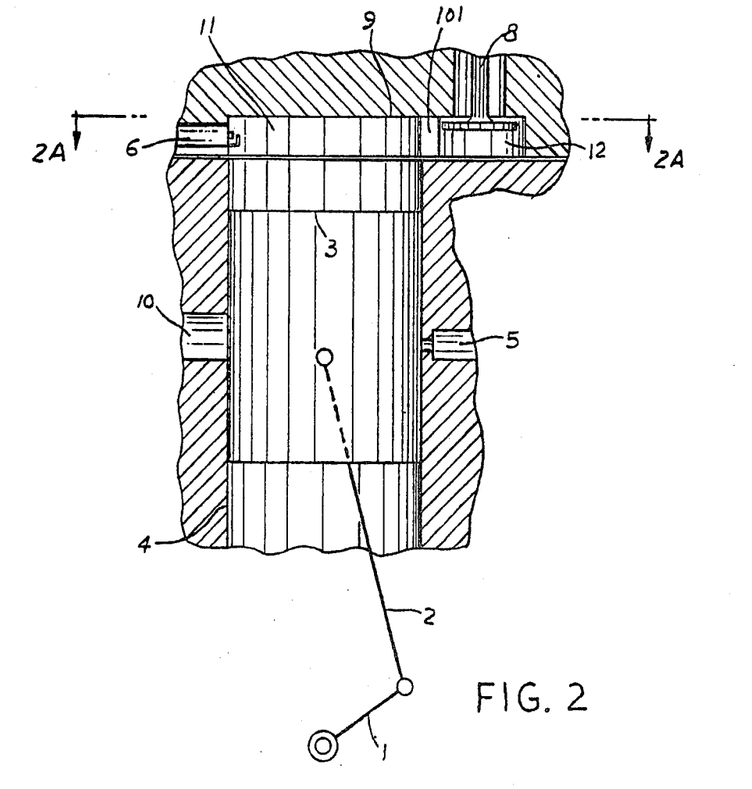
FIG. 2 is an elevational view of another embodiment of the present invention, partly in section.

In all of the embodiments described in the drawings there are certain commonly numbered components as follows:

1 = Crankshaft
2 = Connecting rod
3 = Piston
4 = Cylinder
5 = Fuel Injector
6 = Spark Plug
7 = Inlet or Suction Valve
8 = Exhaust Valve
9 = Cylinder Head
10 = Scavanging Port
11 = First or Main Combustion Chamber
12 = Auxiliary or Second Combustion Chamber, also called a Recess
101 = Throat
102 = Intake Pipe or Manifold Generally, there may be one or more fuel injectors and/or one or more spark plugs, depending on the size of the engine. The cylinder head may be divided into two chambers, namely, the first or main combustion chamber and the second or auxiliary combustion chamber. In FIGS. 1 and 2 of my aforesaid prior Patent Applications Ser. Nos. 376,304 and 667,409, the main combustion chamber is located at the top of the cylinder above the piston and the second or auxiliary combustion chamber is attached to the first chamber from the top, and looks like a separate recess in the cylinder head. The present application discloses alternative designs.

Figure 1A:
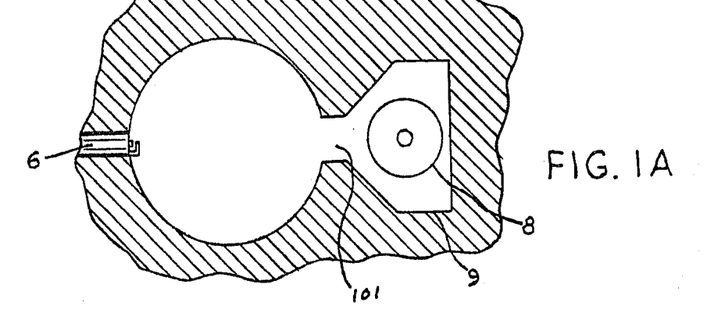
FIG. 1A is a horizontal cross-sectional view along the lines 1A–1A of FIG. 1.
Figure 2A:
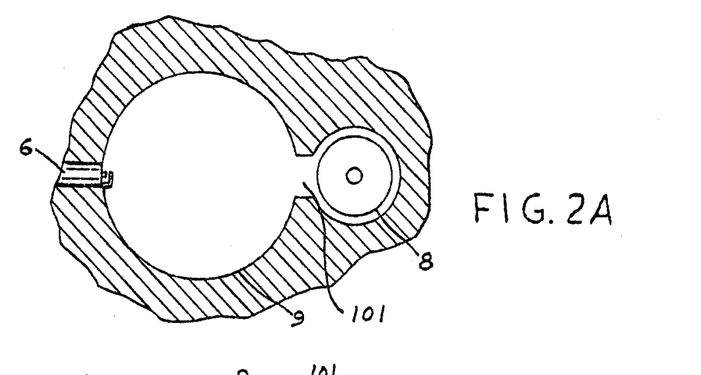
FIG. 2A is a horizontal cross-sectional view along the lines 2A—2A of FIG. 2.

FIGS. 1 and 1A of the present application disclose a preferred embodiment of a four-stroke engine and FIGS. 2 and 2A disclose another preferred embodiment adapted to use in a two-stroke engine.

Thus, in FIGS. 1, 1A, 2 and 2A hereof, the first or main combustion chamber 11 is located on top of cylinder 4 and the second or auxiliary combustion chamber 12 is attached to the first chamber 11 from the side, as shown in FIGS. 1 and 1A for four-stroke engines, and in FIGS. 2 and 2A for two-stroke engines. The auxiliary combustion chambers in all embodiments of the invention are attached to, or formed of, the engine frame and are non-moving parts of the engine. The spark plugs are located in the main combustion chamber. In FIGS. 1 and 1A, the inlet and exhaust valves are located on the auxiliary chamber. In FIGS. 2 and 2A the exhaust valve 8 is in the auxiliary chamber 12 and the scavenging port 10 is in the cylinder 4.

My invention covers the four-stroke and the two-stroke cycle spark ignition internal combustion engines using gasoline or similar fuel. In the embodiment of FIGS. 1, 1A, 2 and 2A, fuel is injected by the fuel injectors 5 when the piston is at or near its bottom dead center or the end of the suction stroke. Also, an extra lean mixture or pure air is sucked into the cylinder through intake valve 7 in the case of a four-stroke engine, or enters through the scavenging port 10 in the case of a two-stroke engine.

The feature of injecting fuel directly into the cylinder when the piston 3 is at or near its bottom dead center or the end of the suction stroke creates a fuel-rich layer at the top of the piston where the heat of the piston can quickly evaporate the fuel. As the piston travels upwardly in its compression stroke, turbulence ordinarily would cause mixing of air and fuel. If there were enough time for such mixing, the air and fuel would become homogeneous throughout the cylinder. In a real engine according to my invention, however, the time interval for said compression stroke is extremely short. Therefore, the said mixing does not substantially occur, and the air-rich parcel at the top stratum is pushed into the auxiliary chamber 12 and is prevented from re-entering the main chamber 11 during the compression stroke due to the effect of the throat 101. Therefore, at the end of the compression stroke, the fuel-rich and the air-rich parcels are segregated and stored in the main chamber 11 and the auxiliary chamber 12, respectively. The spark plug(s) 6 are located in the main or first combustion chamber 11. Therefore, when the spark plug(s) 6 give ignition, the mixture surrounding them is rich enough to get ignited. Then the air-rich parcel trapped in the said second chamber 12 is released during the ensuing expansion stroke, and the air will mix with the unburned fuel-rich parcel and burn it more completely due to the violent turbulence and high temperature generated during the process of combustion.

Figure 3:
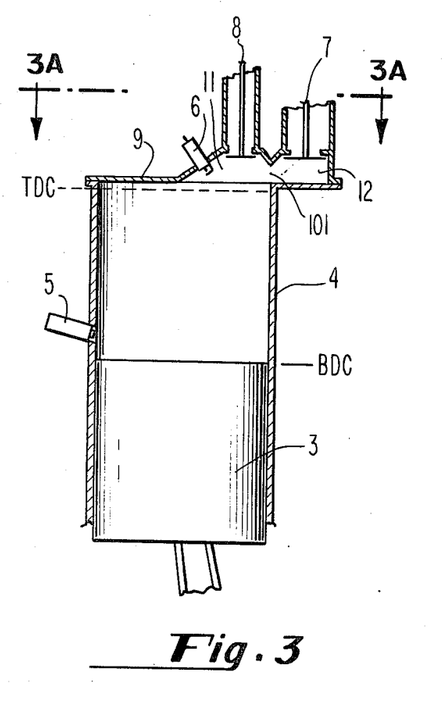
FIG. 3 is an elevational view, partly in section, of another embodiment of the present invention.
Figure 3A:
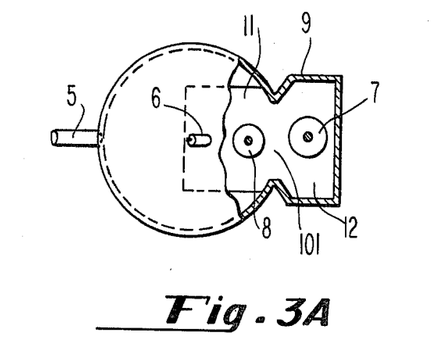
FIG. 3A is a horizontal cross-sectional view along the lines 3A—3A of FIG. 3.

A further modification is shown in FIGS. 3 and 3A wherein the engine has a fuel injector 5 located near BDC, which injects fuel near the end of the intake stroke and creates a stratified air-fuel mixture of which the lean part in the upper layer is driven through the throat 101 and enters the auxiliary or second combustion chamber 12 at the side of the cylinder head in the ensuring compression stroke before it gains the necessary time to mix with the rich part in the lower layer. Thus, at the end of the compression stroke, the lean and rich parts are segregated: the lean part is contained primarily within the chamber 12 and the rich part primarily within the chamber 11 due to the effect of the throat 101 which prohibits any reverse flow due to turbulence during the compression stroke. Thus, when the spark plug 6 gives ignition at or near the end of the compression stroke in the main combustion chamber 11, there is a cloud of rich mixture around the spark plug 6. During the ensuing expansion stroke, the lean mixture in the second chamber 12 is released to supply the excessive air which is required for complete combustion and to reduce the emission of pollutants.

In FIGS. 3 and 3A, the intake valve 7 is located in Chamber 12 and the exhaust valve 8 in chamber 11.

Figure 4:
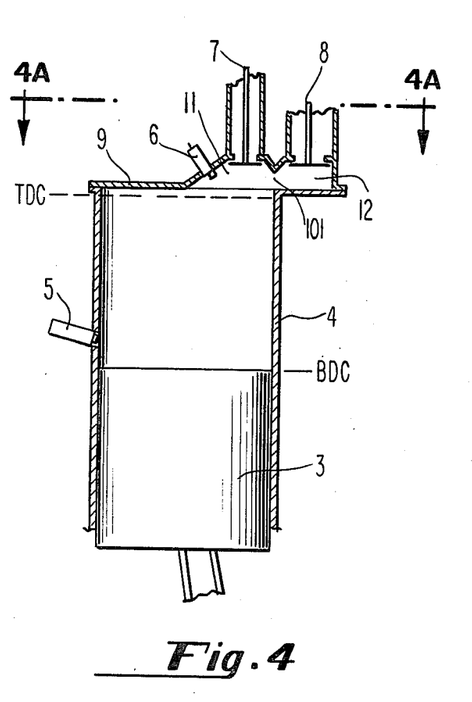
FIG. 4 is an elevational view, partly in section, of another embodiment of the present invention.
Figure 4A:
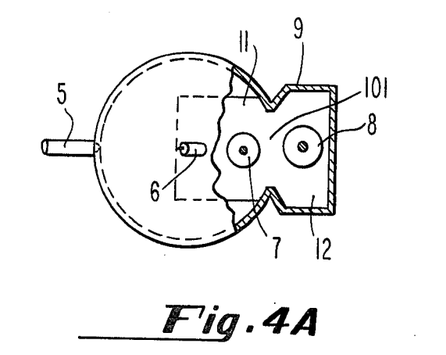
FIG. 4A is a horizontal cross-section along the lines 4A—4A of FIG. 4.

In FIGS. 4 and 4A, the intake valve 7, however, is located in chamber 11 and the exhaust valve in chamber 12. In either embodiment, i.e., in FIGS. 3 and 3A or FIGS. 4 and 4A, the stratification described above will occur.

Figure 5:
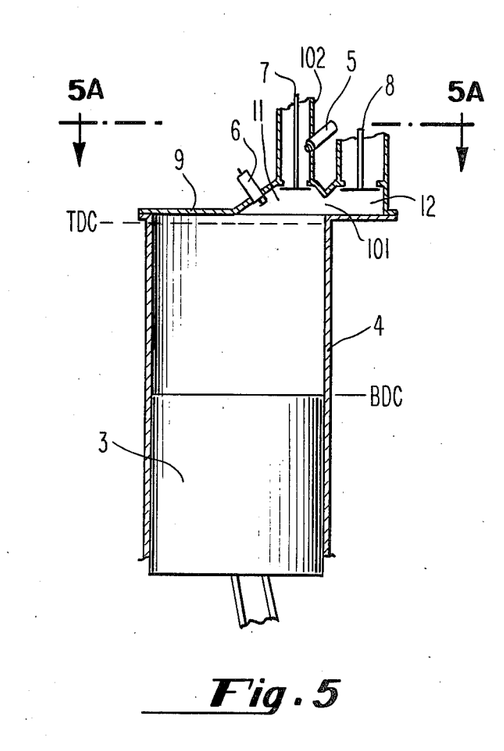
FIG. 5 is an elevational view of another embodiment according to the present invention, partly in section.
Figure 5A:
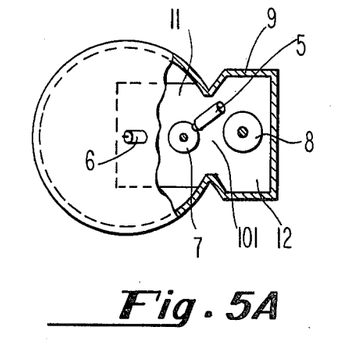
FIG. 5A is a horizontal cross-sectional view along the lines 5A—5A of FIG. 5, partly in section.

FIGS. 5 and 5A show a further modification in which the intake valve 7 is located above chamber 11 and the exhaust valve 8 above chamber 12 and a fuel injector 5 is located adjacent to intake valve 7 so that it injects fuel on the upstream side of the intake valve 7. The fuel is injected once every cycle of four strokes preferably prior to the opening of the intake valve 7 regardless of the piston position so as to create a fuel-rich parcel on the back of the intake valve 7, and an air-rich parcel behind the fuel parcel, thus creating a stratified air-fuel configuration in the intake pipe or manifold 102. Thus, during the intake stroke, when the valve 7 opens, said parcels of stratified fuel and air pass through the intake opening normally closed by valve 7. Since the flow is induced by the unidirectional downward movement of the piston 3, and since the diffusion of the turbulence in a unidirectional flow of fluid is strong in the direction which is perpendicular to the flow and weak in the direction of the flow, the stratified configuration will not be significantly affected in the axial direction of the cylinder 4. Thus, at the end of the intake stroke, stratification is obtained.

Figure 6:
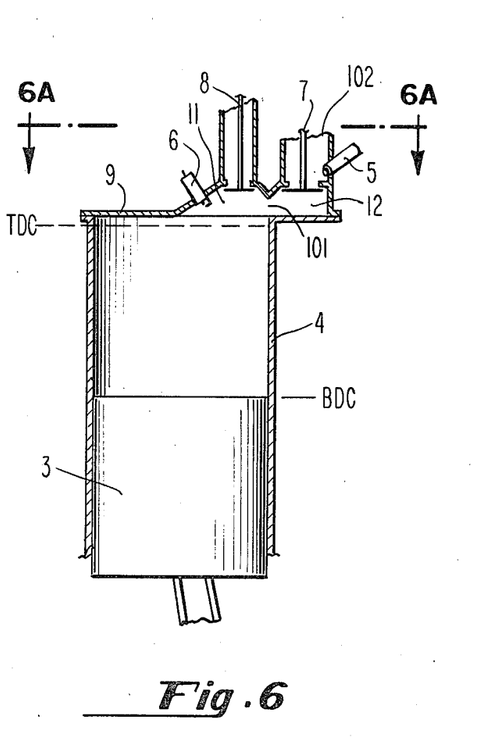
FIG. 6 is an elevational view of another embodiment of the present invention, partly in section.
Figure 6A:
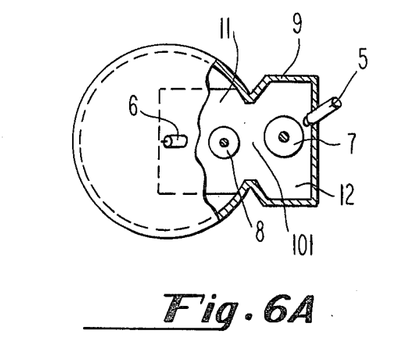
FIG. 6A is a horizontal view along the lines 6A—6A of FIG. 6, partly in section.

In FIGS. 6 and 6A, the intake valve 7 is located above chamber 12 and the exhaust valve 8 above chamber 11. In this embodiment, the fuel injector 5 is located in the intake manifold 102 upstream of the intake valve 7. Here again, when the engine is operated in the manner described above, stratification occurs when intake valve 7 is opened and the stratified fuel and air is drawn into chamber 12, through throat 101 and thence down into the cylinder 4 as the piston moves downward.

Figure 7:
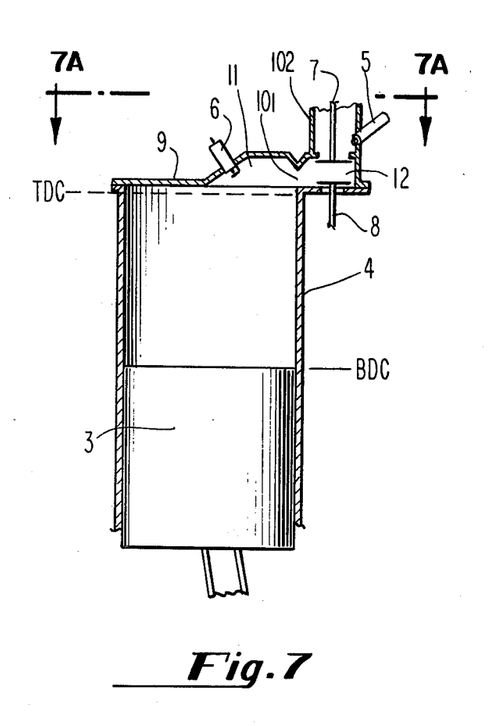
FIG. 7 is an elevational view of another embodiment of the present invention, partly in section.
Figure 7A:
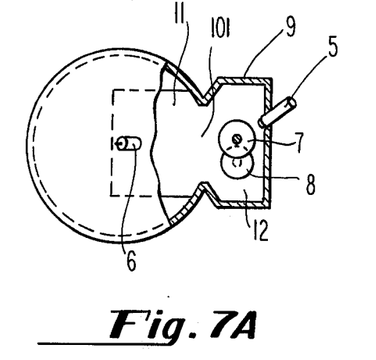
FIG. 7A is a horizontal cross-sectional along the line 7A—7A of FIG. 7, partly in section.

In FIGS. 7 and 7A, the intake valve 7 is located above chamber 12 and the exhaust valve 8 is also located in chamber 12. In this modification, the fuel injector 5 is located in the intake manifold 102 upstream of the intake valve 7 and the engine is operated as previously described.

Figure 8:
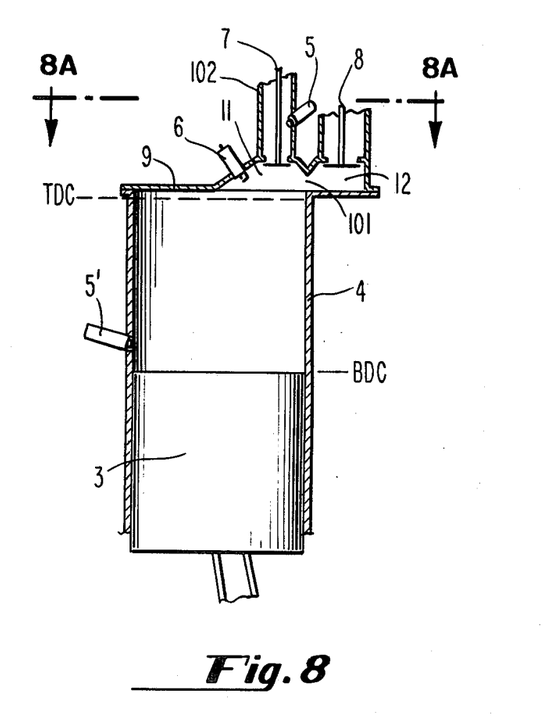
FIG. 8 is an elevational view of another embodiment of the present invention, partly in section.
Figure 8A:
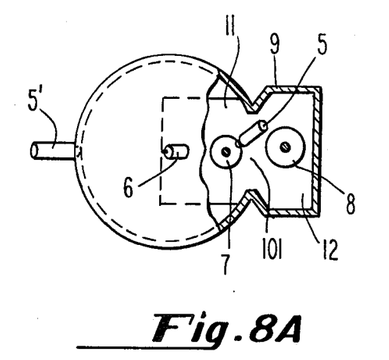
FIG. 8A is a horizontal cross-section along the line 8A—8A of FIG. 8, partly in section.

In FIGS. 8 and 8A, the intake valve 7 is located above chamber 11 and the exhaust valve above chamber 12. The fuel injector 5 is located in the intake manifold 102 upstream of intake valve 7. In this embodiment, a second fuel injector 5' is located near bottom dead center for the injection of fuel near the end of the intake stroke to augment the rich part of the stratified air-fuel mixture. Here again, the engine operates as previously described.

Figure 9:
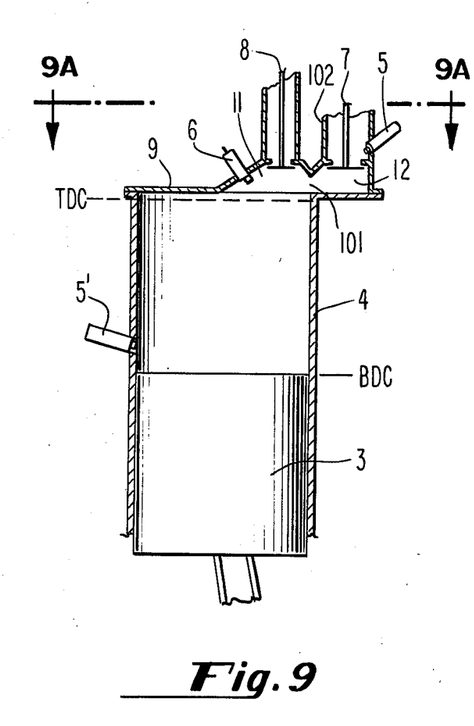
FIG. 9 is an elevational view of another embodiment of the present invention, partly in section.
Figure 9A:
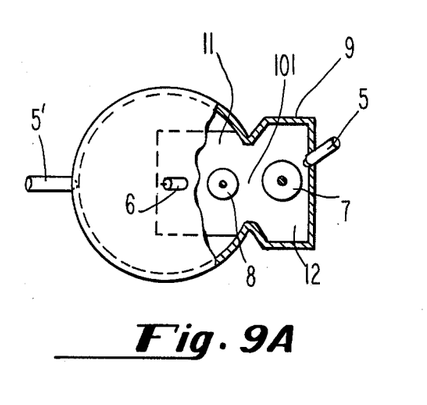
FIG. 9A is a horizontal cross-sectional view along the lines 9A—9A of FIG. 9, partly in section.

In FIG. 9, the intake valve 7 is located above chamber 12 and the exhaust valve above chamber 11. A fuel injector 5 is located in the intake manifold 102 upstream of intake valve 7 and a second fuel injector 5' is located near bottom dead center for the purposes described in connection with FIGS. 8 and 8A.

Figure 10:
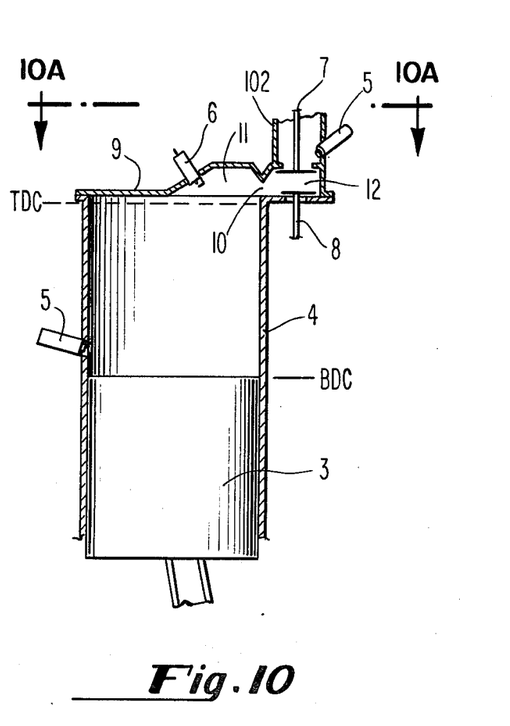
FIG. 10 is an elevational view of another embodiment of the present invention, partly in section.
Figure 10A:
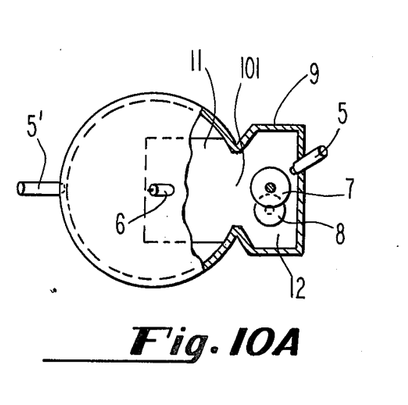
FIG. 10A is a horizontal cross-section along the line 10A—10A of FIG. 10, partly in section.

In FIGS. 10 and 10A, both the intake valve 7 and exhaust valve 8 are located in chamber 12. There is a fuel injector 5 located in the intake manifold 102 upstream of intake valve 7 and another fuel injector 5' located adjacent bottom dead center for the purposes of augmenting the fuel injection as previously described.

Figure 11:
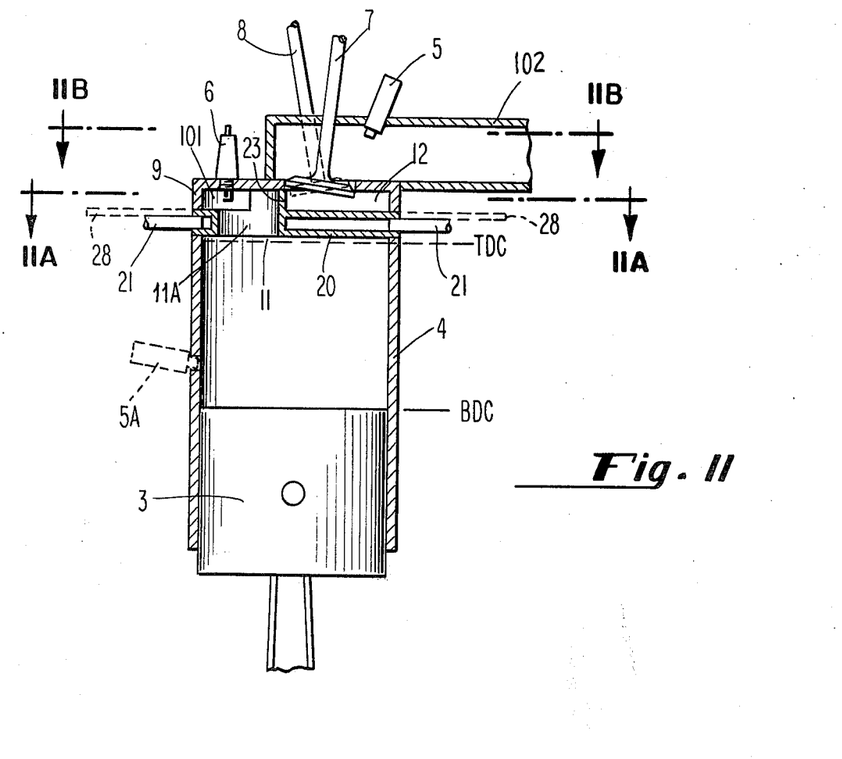
FIG. 11 is an elevational view, partly in section, of another embodiment of the present invention.
Figure 11A:
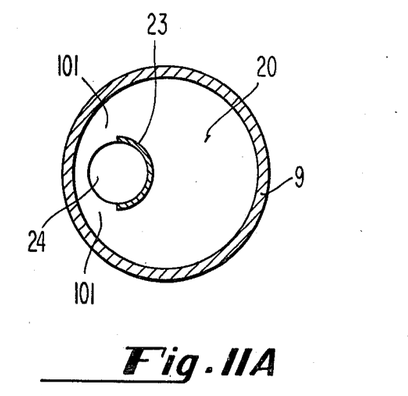
FIG. 11A is a horizontal cross-sectional view along the line 11A—11A of FIG. 11, partly in section.
Figure 11B:
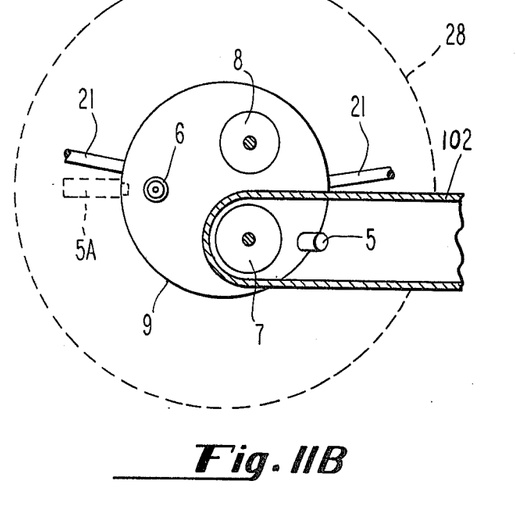
FIG. 11B is a horizontal cross-sectional view along the lines 11B—11B of FIG. 11, partly in section.

FIGS. 11, 11A and 11B schematically show the invention as applied to a conventional engine, such as a Volkswagon four cylinder engine (only one cylinder of which is shown). In this case, a metal plate or "shield" 20 is provided between the cylinder head 9 and the main body of the cylinder 4. The shield 20 has a hole 24 which is partially surrounded by an upstanding collar 23 so as to create the throat 101 separating the main chamber 11 and the auxiliary chamber 12. In this embodiment, the main chamber includes the space 11A surrounded by the collar 23. Fuel may be injected directly into an intake manifold 102 by means of a fuel injector 5 in the manner described previously, upstream of the intake valve 7, so that when the piston 3 is descending, the stratified fuel and air enters through the valve opening, and passes through the throat 101 and the hole 24 and into the space above piston 3. In addition to the fuel injector 5, or as an alternative thereto, a fuel injector 5A (indicated by dotted lines) may be used to inject fuel near to bottom dead center.

In this embodiment as the intake stroke begins, the air and fuel parcels are drawn through the opening 7, around collar 23, through the throat 101 (the throat being created by the edges of collar 23 and the top and side of the cylinder head 9) through hole 24 and remain stratified with the fuel-rich parcel just above the piston 3 and the air-rich parcel essentially occupies chamber 12 and the top layer of the cylinder 4 at the end of intake stroke. When the piston begins to rise on the compression stroke, the lean portion below the shield 20 is pushed through the hole 24 through throat 101 and into chamber 12 so that, at the end of the compression stroke there is a rich mixture located above piston 3 in the main combustion chamber 11 and 11A. Thus, when the spark plug 6 fires, it ignites the rich portion in main combustion chamber 11 and 11A and combustion of the stratified air-fuel mixture takes place as described previously.

The aforesaid stratification is enhanced, as is ignition, by the use of a collar 23 surrounding the hole 24 which tends to confine the rich portion of the air-fuel mixture in the area of the terminal of the spark plug 6 when ignition occurs.

In the embodiment shown in FIGS. 11 and 11A, the shield 20 may be cooled by means of interior passages with coolant via pipe 21 which pass cooling fluid by means of a pump (not shown) so as to prevent the shield 20 from destruction by heat. Alternatively, or in addition to such cooling means 21, the shield 20 may be equipped with fins 28 for the purpose of cooling the shield 20 by means of heat exchange with the surrounding air.

Figure 12:
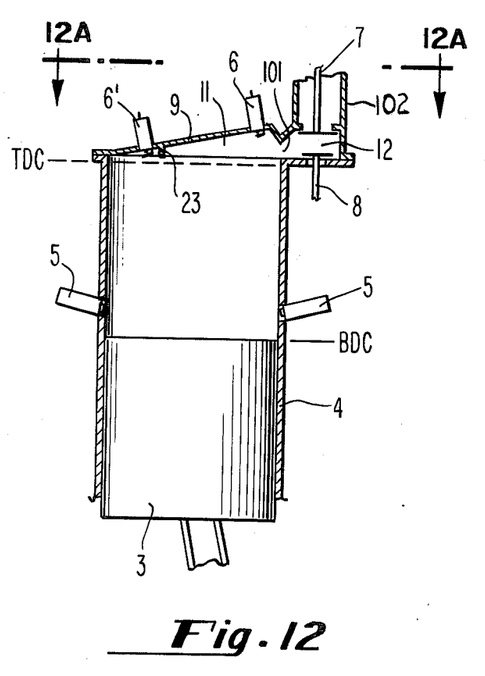
FIG. 12 is an elevational view, partly in section, of another embodiment of the present invention.
Figure 12A:
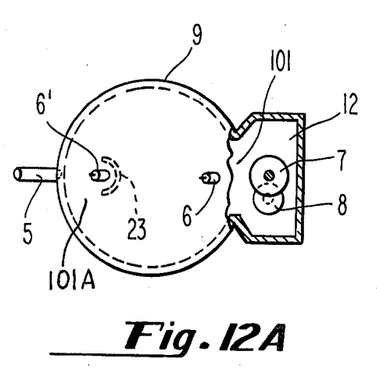
FIG. 12A is a horizontal cross-sectional view of the lines 12A—12A of FIG. 12, partly in section.

FIGS. 12 and 12A disclose another embodiment of the present invention as applied to a four-stroke engine and illustrating the use of multiple spark plugs and multiple fuel injectors.

Figure 13:
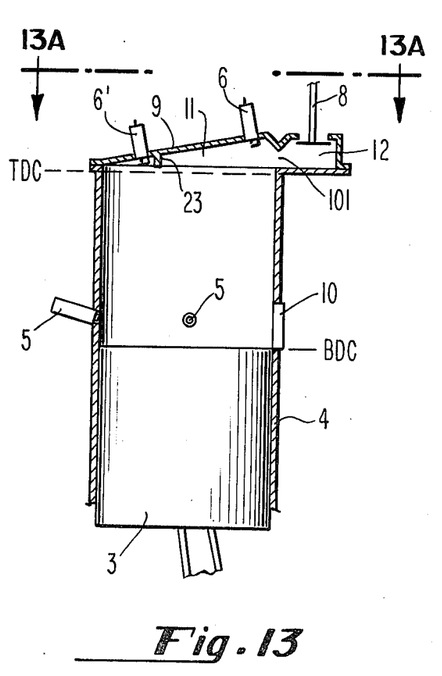
FIG. 13 is an elevational view, partly in section, of another embodiment of the present invention.
Figure 13A:
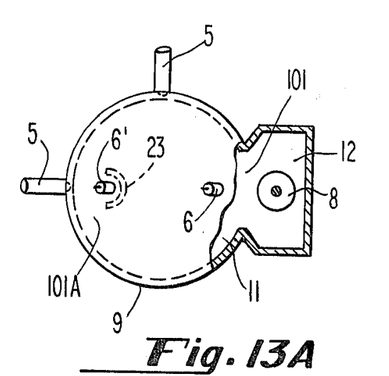
FIG. 13A is a horizontal cross-sectional view along the lines 13A—13A of FIG. 13.

FIGS. 13 and 13A are similar to FIGS. 12 and 12A except that the engine shown therein is a two-stroke engine.

In the engine shown in FIGS. 12 and 13, the main combustion chamber 11 is provided with multiple spark plugs, 6 and 6', and fuel injectors 5 are inserted in the cylinder for injection of fuel at or near bottom dead center. It will be noted that the cylinder head slopes from left to right in the drawings, in an upward manner, so that the space 11 increases in volume up to throat 101 which separates chamber 11 from chamber 12. The spark plug 6 is placed in the main chamber adjacent to throat 101 and another spark plug 6' is placed at the left hand side of the main chamber 11 as shown in the drawings, at a position where the cylinder head is just above the top dead center. The spark plugs 6' are partially surrounded by a collar 23 and such collars 23 serve, together with the cylinder head and the piston at top dead center to provide a constricted passage or throat 101A.

The advantage of multiple spark plugs as shown in FIGS. 12 and 13 is that they serve to shorten the flame travel length during combustion and therefore make it possible to achieve higher compression ratios, higher thermal efficiencies, lower gasoline Octane number, higher engine speeds and less engine weight. Furthermore, the use of multiple plugs improved the reliability of continuous ignition.

In addition, as mentioned, the cylinder can accomodate multiple fuel injectors which are operative when the engine speed is high and the time available for injection is short, and/or when the cylinder size is large and better penetration and distribution of fuel droplets is necessary or desirable.

The use of the collars 23 in FIGS. 12 and 13 form a throat 101A, as indicated, and also servo to reduce the intensity of turbulence around the spark plug 6' when the engine speed is very high.

In all of the embodiments disclosed herein, in addition to regulating the amount of fuel injected in each power cylinder for various loads, reduction of pollutants can be further reduced by skipping fuel injection into one or more cylinders when the load is light.

Figure 16:
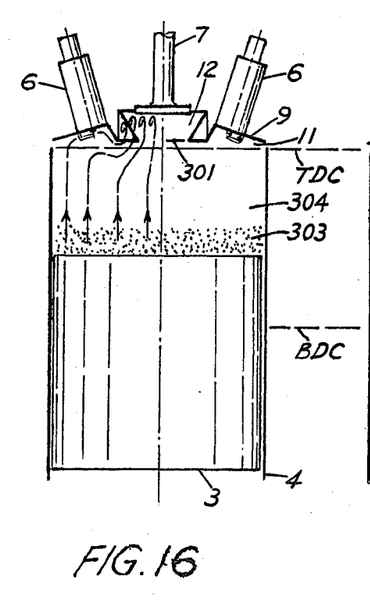
Figure 17:
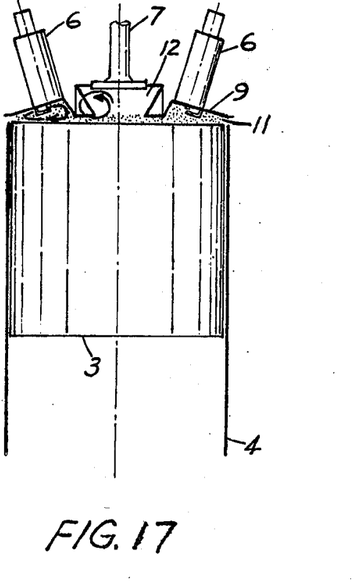
Figures 18, 18C:
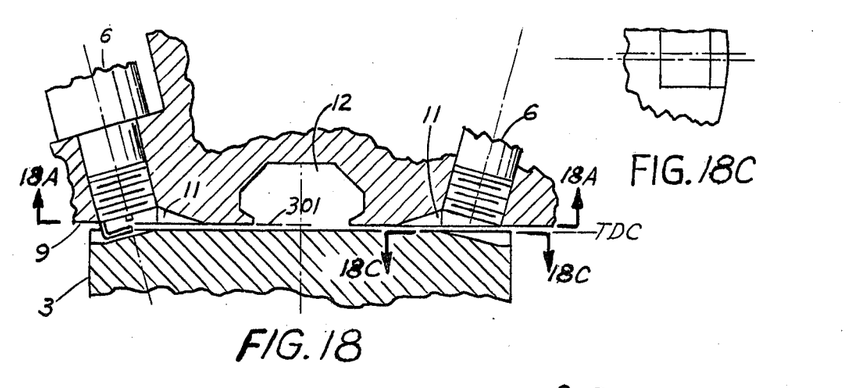
Figures 18A, 18B:
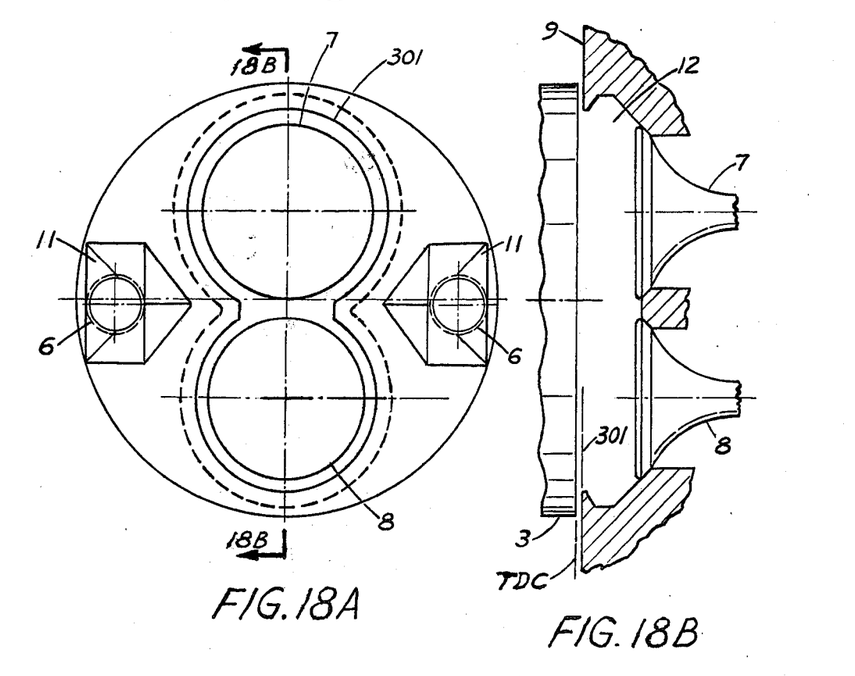
Figures 19, 19B:
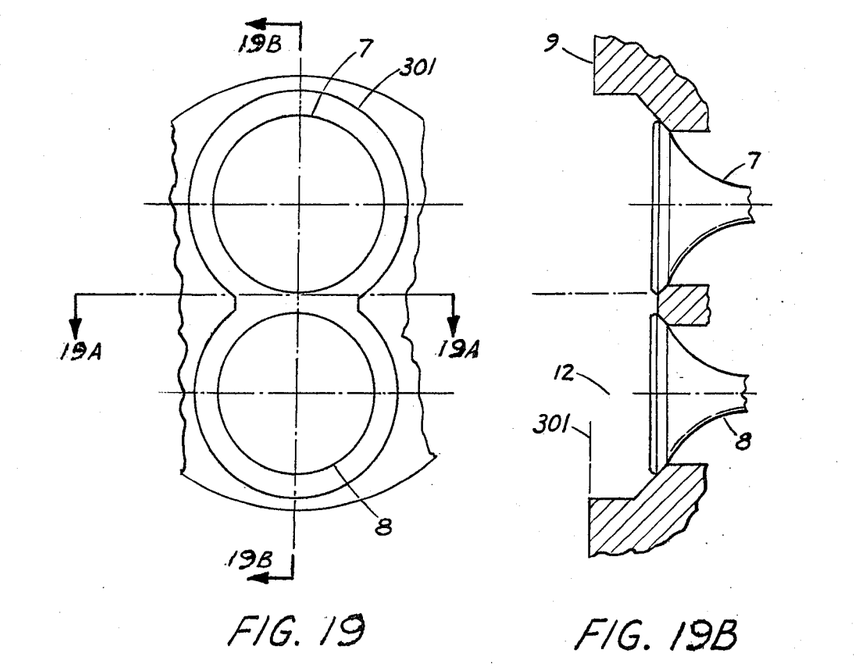
Figure 19A:
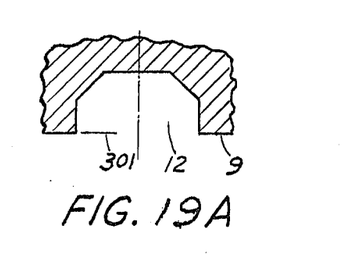

FIGS. 14, 15, 16 and 17 show another embodiment of the invention including details of the combustion chamber assembly of which a conceptual design is shown in FIGS. 18 and 19.

Figures 14, 15:
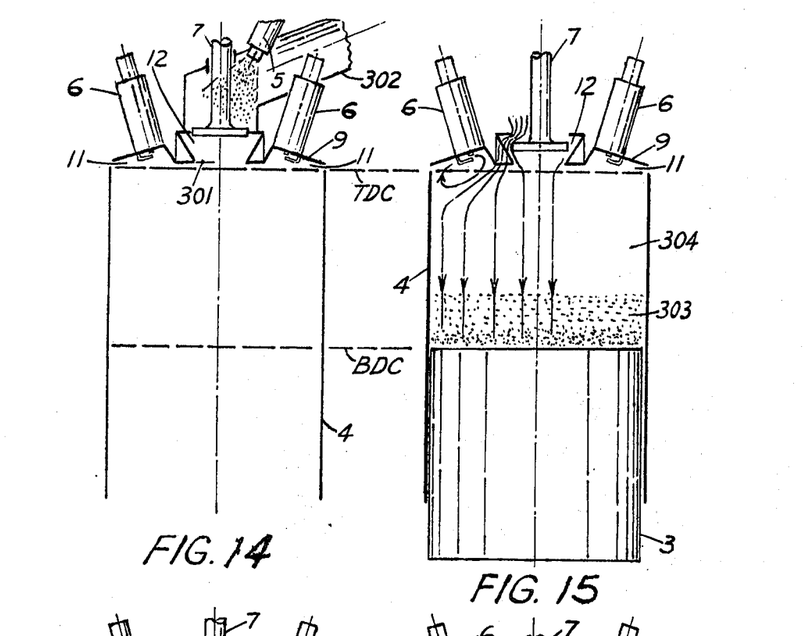
FIGS. 14–19 illustrate further embodiments of the invention.

In FIGS. 14 through 19, the parts are numbered as follows:
- 3 = Piston
- 4 = Cylinder
- 5 = Fuel injector
- 6 = Spark plug
- 7 = Intake valve; 8 = Exhaust valve
- 9 = Cylinder head
- 11 = Rich mixture subchamber (or primary chamber)
- 12 = Lean mixture subchamber (or secondary chamber)
- 301 = Throat or Stepwise reduced opening between the rich mixture chamber 11 and the lean mixture chamber 12
- 302 = Intake manifold or pipe
- 303 = Rich mixture
- 304 = Lean mixture As shown in FIG. 14, gasoline or similar fuel is injected into the intake manifold 302 towards the back side of the intake valve 7 by the injector 5 during the time interval when the intake valve 7 is closed so as to create a stratified air-fuel mixture inside the intake manifold with the rich portion near the intake valve 7. Such stratified mixture is sucked into the cylinder during the intake stroke.

As shown in FIG. 15, at the end of the intake stroke the stratified mixture is composed of a rich mixture layer 303 directly above the piston 3, and a lean mixture layer 304 on top of the rich mixture 303, with a high degree of stratification regardless of the action of passing through the intake valve 7 and the throat 301. This is because the turbulence caused by the said action was weak diffusivity in the direction of flow and strong diffusivity in the direction perpendicular to the flow, and the time elapsed is very short. As a result, the air and fuel mix with each other very well within the same layers parallel to the piston top, but very poorly between different layers.

As shown in FIG. 16, during the ensuing compression stroke the top layer of lean mixture 304 is squeezed into the lean mixture subchamber 12 through the throat or stepwise reduced opening 301 which causes a vena-contracta of fluid flow at the entrance of the lean subchamber 12, and thus isolates the strong turbulence within the lean subchamber 12.

As shown in FIG. 17, at or near the end of the compression stroke, the rich mixture 303 is trapped in the rich mixture subchamber 11 where the spark plugs 6 are located. Thus, when the spark plugs give ignition, the mixture surrounding them is rich enough to ensure ignition while the overall mixture is lean enough to enhance complete combustion.

The flow patterns as shown in FIGS. 15, 16 and 17 by the streamlines or pathlines are simplified so as to enable the reader to visualize the mechanism of actions. The real flow patterns are three dimensional, and related to the design details of the two combustion subchambers as shown in FIGS. 18 and 19.

FIGS. 18, 18A, 18B, 18C and 19, 19A, and 19B are drawn in full scale for a design of a real combustion chamber which is easily adaptable to existing automobile engines, and satisfies the requirements as follows:
- Small surface area to reduce heat loss
- High compression ratio to increase fuel economy
- Short flame travel length to tolerate high compression ratio and low octane number of fuel
- Cheap manufacturing cost
- High air-fuel ratio, say 24 to 1, to enhance complete combustion The sample design shown is based on the test result of a prototype engine which has proved the embodiment of this invention described in FIGS. 14, 15, 16 and 17 to be feasible to have an engine working on an air-fuel ratio of 24 over.

On the basis of the test result of the prototype engine it is possible to set the air-fuel ratio at 24 to 1 for low-speed driving of a car in cities. From handbook data the combustion efficiency for such air-fuel ratio (AFR) is 96.9%. The combustion efficiency for the AFR of 14 to 1 is 89.6%. Since it is a conservative estimate that an engine operating at 14 to 1 AFR would have an overall efficiency of 30%, therefore the overall efficiency of the new engine is estimated to be 33%.

Let the engine size be 2000 cc with four cylinders. Let the cylinder diameter = 9.2 cm, and the stroke length = 7.55 cm. The volumetric efficiency is assumed to be 90%. The lower heating value of gasoline = 10278 cal/gm. Thus the engine speed would be 650 rpm for a power output of 10.2 PS (10 hp). The relative piston speed = 1.64 m/sec. The engine would be able to deliver 61 PS (60 hp) when the piston speed approaches its high limit.

Since the high AFR can be maintained up to the high power output of 61 PS, the combustion temperature will be much lower than that of a conventional engine, and accordingly the compression ratio can be safely raised to, say, 11 to 1. Such compression ratio would further increase the overall efficiency and power output. In addition, each cylinder can have two spark plugs so as to shorten the flame travel length to, say, 6 cm. This feature will further make higher compression ratio possible.

The total volume of the two combustion subchambers 11 and 12 is 50 cc for the compression ratio of 11 to 1. Let the intake and exhaust valve disc diameters be 3.7 and 3.4 cm respectively. A layout of the two combustion subchambers as shown in FIGS. 18, 18A, 18B, 18C and 19, 19A and 19B give the following data:
- The volume of the large recess (lean subchamber 12) in the cylinder head 9 on top of throat or stepwise reduced opening 301 = 40 cc
- The volume of the four small recesses (portion of the rich mixture subchamber 11) in the cylinder head 9, and in the piston 3 for accomodating spark plugs = 2 cc
- The gap between TDC and cylinder head 9 = 1.2 mm which gives an additional volume of 8 cc to the rich mixture subchamber A conservative estimate of flame travel speed would be 18 m/sec. Thus the time interval for the combustion of the rich mixture in the rich mixture chamber 11 would be 0.0033 sec. At the engine speed of 600 and 3000 rpm, this time interval is equal to 12 and 60 degrees of crankshaft angles respectively, and would need the spark advances of 6 and 30 degrees respectively. These are acceptable figures.

It should be noted that the ratio of the spaces allocated for the primary and the secondary chambers are 10 and 40 cubic centimeters respectively. It is essential that the primary chamber be made small in size, say, 10 to 20 percent of the total space of the combustion chambers.

As an alternative design, the piston stroke length can be increased to 9.4 cm, and the engine size will be 2500 cc. The total space of the two chambers will be 62.5 cc of which the space allocated for the primary chamber will still be 10 cc or 16 percent of the total space.

If the total space of the two subchambers 11, 12 be kept at 50 cc after the engine size is increased to 2500 cc, ie., the piston displacement is 625 cc, then the compression ratio will be 13.5 which should not be regarded as an impossible figure due to the fact that the combustion temperature is low because of the high air-fuel ratio, and the flame travel length is short because of two spark plugs.

Therefore, one can see the same design has enough flexibility for further improvement.

The main difference between FIGS. 18 (ABC) and 19, 19A and 19B is that in FIG. 19 the throat is the invisible vena-contracta caused by the air-fuel mixture flowing through the stepwise passage 301 in the cylinderhead. Therefore, the stepwise passage is considered to be an equivalent throat. In FIG. 18 (ABC) the throat 301 is formed by the protruding metal shoulders shown. The quantitative difference of the effects between the throat and the stepwise passage on the engine performance is yet to be measured through experiments. However, the stepwise passage has the advantage of reducing the manufacturing cost of the cylinderhead. In any event, the throat 301 is designed to produce a sudden change (from about 80° up to about 180° with a preference for 80°–90°) in the ideal outermost streamlines of fluid flow so as to cause a vena-contracta which isolates inside the lean subchamber 12, the strong turbulence caused by the compression stroke.

It should be noted that the cylinderhead 9 and the piston top are shaped to provide space for the spark plugs 6 and serve as the rich mixture subchamber 11. These spaces are preferably provided with wide entrance and shallow depth so as to first cause the fluid streamline and pathline parallel to the rich subchamber wall and leave no dead pocket against sweeping action by the upper lean mixture 304 on its way to its lean subchamber 12 during the earlier part of the compression stroke as shown in FIG. 16, and later cause the fluid flow to become a trapped vortex of the lower rich mixture 303 inside the rich mixture subchamber 11 during the moment which is near the completion of the compression stroke as shown in FIG. 17.

The throat opening 301 comprises a stepwise passage having a sudden change in cross-sectional area for fluid flow so as to cause a vena-contracta which isolates inside the auxiliary chamber the strong turbulence caused by the compression stroke so that relatively minor mixing of the stratified mixture occurs throughout the compression stroke.

It is also to be noted that the main chamber 11 has a vertical depth less than its cross-sectional width. This configuration causes the fluid stream-line and pathline parallel to the chamber wall whereby substantially no dead pocket occurs upon the sweeping action by the upper, air-rich layer of the air-rich parcel as the latter layer passes to the auxiliary subchamber 12 during the initial phase of the compression stroke and later causes the fluid flow to become a trapped vortex of a lower layer of fuel-rich parcel inside the main chamber near the completion of the compression stroke.

Further, the spark means may preferably be located in the main chamber 11 at or near the top dead center so as to ignite the fuel-rich parcel at or near the end of the compression stroke. In one preferred embodiment, the top of the piston 3 has a depression or recess underneath the spark plug 6 to accomodate the protruding part of the plug.

With regard to the methodology described and shown herein, it is preferred that the air and fuel are drawn into the cylinder in a time interval short enough to substantially prevent mixing in the direction of the flow of such portions.

I claim:

1. In a spark ignition engine having means for fuel injection, a piston, a cylinder including a cylinder head, means for obtaining stratification of the air-fuel mixture comprising:
    (a) a combustion zone having main and auxiliary combustion chambers;
        (i) the main combustion chamber being bounded by the piston top at or near top dead center, a part of the cylinder head and a throat leading to the auxiliary combustion chamber;
        (ii) an auxiliary combustion chamber affixed to the engine and located adjacent the side of said main chamber and communicating by said throat therewith, said auxiliary chamber being a non-moving part of the engine;
    (b) inlet means for introducing air into the combustion zone and exhaust means for evacuating the gases from the cylinder after combustion;
    (c) fuel injector means for injecting fuel into a layer at or near the piston top when the piston is at or near bottom dead center to create a fuel-rich layer at the vicinity of the piston top at the end of intake stroke so as to provide a fuel-rich parcel in said main chamber later at the end of compression stroke;
    (d) spark means for igniting the said fuel-rich parcel created in the said main combustion chamber when the piston is at or near the top dead center,
whereby combustion begins in said main combustion chamber and receives a secondary air supply from said auxiliary combustion chamber.

2. The invention of claim 1 wherein the engine is a four-stroke engine.

3. The invention of claim 2 wherein the fuel injector means is located at or near the bottom dead center.

4. The invention of claim 2 wherein the spark means is located in the main combustion chamber.

5. The invention of claim 2 wherein the inlet means and exhaust means are located at the auxiliary combustion chamber.

6. The invention of claim 1 wherein the engine is a two-stroke engine.

7. The invention of claim 6 wherein the fuel injector means is located at or near the bottom dead center.

8. The invention of claim 6 wherein the spark means is located in the main combustion chamber.

9. The invention of claim 6 wherein the exhaust means is in the auxiliary combustion chamber and the inlet means is in the cylinder.

10. In a two or four stroke spark ignition engine having a piston, means for fuel injection, a cylinder including a cylinder head, a combustion zone located in the cylinder and having main and auxiliary combustion chambers; said auxiliary combustion chamber being located farther from the piston top than the main combustion chamber and affixed to the engine as a non-moving part thereof; said auxiliary chamber communicating with said main chamber through a throat; a method of forming a stratified charge of air-rich and fuel-rich parcels and combusting the same comprising the steps of:
(a) injecting fuel into a layer at or near the piston top when the piston is at or near bottom dead center to create a fuel-rich parcel at the vicinity of the piston top within the main chamber;
(b) drawing an air-rich parcel into the combustion zone above the fuel-rich parcel;
(c) compressing the air-rich and fuel-rich parcels so that a substantial portion of the air-rich parcel enters the auxiliary combustion chamber and a substantial portion of the fuel-rich parcel remains in the main combustion chamber, thereby substantially segregating the air-rich and fuel-rich parcels;
(d) and igniting the said fuel-rich parcel created in the main combustion chamber when the piston is at or near top dead center so that combustion begins in said main combustion chamber and receives a secondary air supply from said auxiliary combustion chamber.

11. A spark ignition engine of the stratified type comprising:
(a) a cylinder;
(b) a piston within the cylinder;
(c) a cylinder head;
(d) a shield having a first side adjacent the air intake means and a second side adjacent to the piston head, said shield located between the cylinder head and the top dead center such that an auxiliary combustion chamber is provided above and on the first side of the shield and a main combustion chamber is provided below and on the second side of the shield above the top dead center; said shield having a hole and a throat communicating between the main and auxiliary chambers;
(e) intake and exhaust means;
(f) Fuel injector means located adjacent to bottom dead center for injecting fuel and operable to create a fuel rich pocket above the piston in the main combustion chamber;
(g) spark means for igniting the fuel rich pocket in the main combustion chamber.

12. The invention of claim 11 wherein the shield is provided with a collar at least partially surrounding said hole.

13. The invention of claim 11 wherein the intake means communicates with an intake manifold, and a fuel injector is located so as to inject fuel into the intake manifold upstream from the intake means.

14. The invention of claim 13 wherein a second fuel injector means is located adjacent bottom dead center.

15. The invention of claim 11 including cooling means for the shield.

16. The invention of claim 15 wherein the cooling means comprises a fluid cooling system for circulating cooling fluid from heat exchange relationship with the shield to an external heat exchanger.

17. The invention of claim 16 wherein the cooling means comprises fins connected in heat exchange relationship to the shield for transferring heat from the shield to the fins and thence to the outside air.

18. In a reciprocating piston gasoline engine having a cylinder, a piston, a cylinder head, exhaust means, reciprocating intake means, a main combustion chamber and an auxiliary combustion chamber, a method for producing low exhaust emissions of hydrocarbon, carbon monoxide and nitrous oxide comprising the steps of:
(a) introducing a charge of fuel into the area behind the intake means to form a fuel-rich parcel;
(b) introducing a charge of air behind the fuel-rich parcel to form a stratified configuration;
(c) passing the said stratified parcels through the intake means into the auxiliary combustion chamber, then through a restricted opening into the main combustion chamber so that the stratified fuel-rich and air-rich parcels are substantially preserved in substantially segregated form;
(d) compressing the fuel-rich and the air-rich parcels so as to position the air-rich parcel substantially in the auxiliary chamber while maintaining a substantially stratified configuration; and
(e) igniting the fuel-rich parcel in the main combustion chamber when the air-rich parcel is in the auxiliary chamber.

19. A method for producing low hydrocarbon, carbon monoxide and nitrous oxide emissions in a gasoline powered engine having a cylinder, a combustion zone having main and auxiliary combustion chambers connected by an aperture, a piston, reciprocating intake means including an intake manifold, exhaust means, fuel injection means, and spark means comprising the steps of:
(a) initially injecting a timed charge of fuel into the intake manifold while the intake valve is substantially closed to create a fuel rich portion;
(b) then opening the intake valve as the piston is descending in an intake stroke while substantially simultaneously drawing air into the intake manifold whereby an air rich portion is drawn in behind the rich fuel portion in a stratified configuration;
(c) drawing the stratified fuel and air portions into the cylinder so that the fuel rich portion is located directly above the piston;
(d) raising the piston to compress the fuel rich portion in the main combustion chamber while positioning the air rich portion into the auxiliary chamber;
(e) directing a part of the fuel-rich portion in the area of the spark plug wherein a portion of the fuel-rich portion is passed into a partially confined area around the spark plug at the time of ignition to provide a fuel-rich parcel of low turbulence around said spark plug;
(f) igniting the spark plug,
whereby combustion begins in the fuel-rich main combustion chamber and subsequently utilizes the air-rich portion in the auxiliary chamber.

20. In a four-stroke spark ignition engine having means for fuel injection, a piston, a cylinder including a cylinder head, and an engine frame, means for obtaining stratification of the air-fuel mixture, comprising:
(a) a combustion zone having main and auxiliary combustion chambers connected to each other through a throat opening;
(i) the main chamber being bounded by the piston top at or near the top dead center, a part of the cylinder head and a throat opening leading to the auxiliary chamber;
(ii) an auxiliary chamber located adjacent to said main chamber and affixed to the engine frame in non-movable relationship to the engine frame and communicating by said throat with said main chamber;

(b) intake means including an intake manifold and a reciprocating intake valve for introducing air into the cylinder and exhaust means for evacuating the gases from the cylinder after combustion;

(c) first fuel injection means located in the intake manifold and adjacent to the back or stem side of the intake valve whereby stratified air-rich and fuel-rich parcels are created once every power cycle and a second fuel injection means located near the bottom dead center for producing a fuel-rich parcel covering the piston top;

(d) spark means located in the said main combustion chamber.

21. The invention of claim 20 wherein a second fuel injection means is located near the bottom dead center for producing a fuel-rich parcel covering the piston top.

22. The invention of claim 20 wherein the intake means is located in the main combustion chamber.

23. The invention of claim 20 wherein the exhaust means is located in the main combustion chamber.

24. The invention of claim 20 wherein the intake and exhaust means are located in the auxiliary combustion chamber.

25. The invention of claim 20 wherein the intake means is located in the auxiliary combustion chamber.

26. The invention of claim 20 wherein the exhaust means is located in the auxiliary combustion chamber.

27. In a four-stroke spark ignition engine having means for fuel injection, a piston, a cylinder including a cylinder head and an engine frame, means for obtaining stratification of the air-fuel mixture, comprising:

(a) a combustion zone having main and auxiliary combustion chambers connected to each other through a throat opening;
  (i) the main chamber being bounded by the piston top at or near the top dead center, a part of the cylinder head and a throat opening leading to the auxiliary chamber;
  (ii) an auxiliary combustion chamber located adjacent to said main combustion chamber and affixed to the engine frame in a non-movable relationship to the engine frame and communicating by said throat with said main chamber;

(b) intake means including an intake manifold for introducing air into the cylinder and exhaust means for evacuating the gases from the cylinder after combustion;

(c) fuel injection means located at or near the bottom dead center for producing fuel-rich parcel covering the piston top;

(d) spark means located in the said main combustion chamber.

28. The invention of claim 27 wherein the intake means is located in the main combustion chamber.

29. The invention of claim 27 wherein the exhaust means is located in the main combustion chamber.

30. The invention of claim 27 wherein the intake and exhaust means are located in the auxiliary combustion chamber.

31. The invention of claim 27 wherein the intake means is located in the auxiliary combustion chamber.

32. The invention of claim 27 wherein the exhaust means is located in the auxiliary combustion chamber.

33. In a four-stroke spark ignition engine having means for fuel injection, a piston, a cylinder including a cylinder head and an engine frame, means for obtaining stratification of the air and fuel comprising:

(a) a combustion zone having main and auxiliary combustion chambers connected to each other through a throat opening;
  (i) the main chamber being bounded by the piston top at or near the top dead center, a part of the cylinder head and a throat opening leading to the second chamber;
  (ii) an auxiliary chamber located adjacent to said main combustion chamber and affixed to the engine frame in a non-movable relationship to the engine frame and communicating by said throat with said main chamber;

(b) intake means including an intake manifold and a reciprocating intake valve for introducing air into the cylinder and exhaust means for evacuating the gases from the cylinder after combustion;

(c) fuel injection means located in the intake manifold and adjacent to the back or stem side of the intake valve for creating a parcel of rich fuel nearest the back of said valve and a parcel of substantially lean air behind said rich fuel parcel once every power cycle regardless of the piston position;

(d) spark means located in the said main combustion chamber;

whereby stratification of air and fuel parcels at the back or stem side of the intake valve is obtained by the injection means and later preserved after entering the main combustion chamber.

34. The invention of claim 33 wherein the volume of the main combustion chamber comprises from about 10% to about 20% of the total volume of the main and the auxiliary combustion chambers.

35. The invention of claim 33 wherein said throat opening comprises a stepwise passage having a sudden change in cross-sectional area for fluid flow so as to cause a vena-contracta which isolates inside the auxiliary chamber the strong turbulence caused by the compression stroke so that relatively minor mixing of the stratified parcels occurs throughout the compression stroke.

36. The invention of claim 33 wherein the main chamber has a vertical depth less than its cross-sectional width so as to cause the fluid stream-line and pathline parallel to the chamber wall whereby substantially no dead pocket occurs upon sweeping action by the upper, air-rich layer of the air-rich parcel as said layer passes to said auxiliary chamber during the initial phase of the compression stroke and later causes the fluid flow to become a trapped vortex of a lower layer of fuel-rich parcel inside the main chamber near the completion of the compression stroke.

37. The invention of claim 33 wherein said spark means is located in the main chamber at or near the top dead center so as to ignite the fuel-rich mixture at or near the completion of the compression stroke.

38. The invention of claim 37 in which the top of the piston has a depression underneath the spark means to accommodate the protruding part of the spark means.

39. The method of claim 19 wherein the air and fuel are drawn into the cylinder in said stratified portions and compressed in a time interval short enough to substantially prevent mixing in the direction of the flow of said portions.

* * * * *